United States Patent [19]

Manabe et al.

[11] Patent Number: 4,461,890
[45] Date of Patent: Jul. 24, 1984

[54] METHOD FOR THE TREATMENT OF WASTE FLUIDS FROM ORANGE CANNERIES AND PROCESS FOR RECOVERING PECTIC SUBSTANCE THEREFROM

[75] Inventors: Masatoshi Manabe, Kagawa; Jun Naohara, Okayama; Hideaki Miyoshi, Kagawa, all of Japan

[73] Assignee: Kabushiki Kaisha Hayashibara Seibutsu Kagaku Kenkyujo, Okayama, Japan

[21] Appl. No.: 468,774

[22] Filed: Feb. 22, 1983

[30] Foreign Application Priority Data

Apr. 19, 1982 [JP] Japan .................................. 57-65955

[51] Int. Cl.$^3$ ............................................. C08B 37/06
[52] U.S. Cl. ......................................................... 536/2
[58] Field of Search ........................................... 536/2

[56] References Cited

U.S. PATENT DOCUMENTS

| | | | |
|---|---|---|---|
| 1,991,242 | 2/1935 | Cole et al. | 536/2 |
| 2,132,065 | 10/1938 | Wilson | 536/2 |
| 2,635,095 | 4/1953 | Norman | 536/2 |
| 3,622,559 | 11/1971 | Wiles et al. | 536/2 |
| 4,065,614 | 12/1977 | Nelson | 536/2 |

Primary Examiner—Ronald W. Griffin
Attorney, Agent, or Firm—Browdy and Neimark

[57] ABSTRACT

Disclosed is an invention providing an improved method to treat a factory waste, and more particularly for the treatment of pectic waste fluids from orange canneries i.e. the acid- and alkaline wastes. The present invention also provides a process to recover pectic substance therefrom. The method contains the steps of (1) adjusting the pH either in the acidic waste or a mixture of acidic- and alkaline waste to a level over 7.0, allowing the waste or mixture to stand for a period sufficient to effect a substantial saponification of the pectic constituent, adding acid to the waste or mixture to bring its pH below 3, separating the pectic substance from the resultant, and treating the resultant supernatant or filtrate by a biological procedure using an active microorganism, or, alternatively, (2) adding acid to the alkaline waste to bring its pH below 3, separating the pectic substance from the resultant, and treating the resultant supernatant or filtrate by a biological procedure using an active microorganism. The resulting high-quality pectic product is advantageously usable in various food products, cosmetics or medicines.

12 Claims, 3 Drawing Figures

METHOD FOR THE TREATMENT OF WASTE FLUIDS FROM ORANGE CANNERIES AND PROCESS FOR RECOVERING PECTIC SUBSTANCE THEREFROM

FIELD OF THE INVENTION

The present invention relates to a method for the treatment of factory wastes, and more particularly to the treatment of pectic waste fluids from orange canneries. The present invention also relates to a process to recover pectic substance therefrom.

DESCRIPTION OF PRIOR ART

In recent years, orange crops have increased to about five million tons per year in Japan, about 4 percent of which are canned.

The term "orange", as referred to in the present specification and claims, designates all kinds of citrus fruits which are processed at canneries where the present invention is applicable. The term "orange cannery" is used in its ordinary English sense to refer to a factory where the oranges are canned.

In addition to conventional canned products mainly consisting of whole orange loculi and syrup, new-type products, canned with disaggregated orange loculi in syrup or juice in suspension, are becoming more and more popular.

Canned orange is an important product in the canning indusry, with a market share in Japan of over about 50% of the all canned fruits.

Generally, canned orange is produced according to the steps as shown in FIG. 1. Since in order to remove the locular walls to obtain the orange flesh, orange canneries use considerable amounts of acid- and alkaline solutions in the locular wall removing step, e.g. hydrochloric acid and sodium hydroxide solutions, they are confronted with the inevitable problem of large accumulations of highly viscous, high pectic content acidic or alkaline factory waste fluid. The term "waste" or "waste fluid", as used in the present specification and claims, shall mean such factory waste fluid.

In addition to the disadvantage that the pectic substance in such waste is only biodegradable with great difficulty, the low temperature in the aeration tank renders the treatment of the intact waste by the activated sludge system very difficult because the operation season of orange canneries is concentrated in cold late autumn or winter.

In order to overcome the above disadvantages, many approaches have been attempted. For example, Takenori MOHRI, *New Food Industry*, Vol. 16, No. 8, pp. 50-59 (1974), describes a typical method comprising adding a large amount of slaked lime to the waste both to coagulate and to precipitate the pectic substance, separating the precipitate, and treating the remaining supernatant or filtrate by the activated sludge system. Since the separation of the pectic substance thereby is, however, insufficient, a heavier loading on the activated sludge system is inevitable. Furthermore, since the separated precipitate per se is difficult to handle, recovery of the pectic substance therefrom is substantially impossible. Thus, the precipitate must be disposed of in remote places. From the viewpoint of environmental pollution and efficient utilization of natural resources, countermeasures are urgently needed to improve the situation.

Thus, there exist strong needs for a low-cost and efficient method to treat the pectic waste fluid from orange canneries and a process to recover the useful pectic substance therefrom. As will become apparent from the following, the present invention does satisfy these needs.

OBJECTS OF THE INVENTION

One object of the present invention is to provide a method to treat the pectic waste fluid from orange canneries.

Another object of the present invention is to provide a low-cost and efficient method for such treatment.

Another object of the present invention is to provide a process to recover the pectic substance from the waste.

A further object of the present invention is to provide a low-cost and efficient process for such recovery.

An additional object of the present invention is to provide a process to obtain a pectic substance in high quality which is widely usable in food products, feeds, cosmetics or medicines.

These and other objects as may become apparent hereinafter have been attained by (1) adjusting the pH in the acidic waste or a mixture of acidic- and alkaline wastes to a level over 7.0, adding acid to the waste or mixture to bring its pH below 3, separating the pectic substance therefrom, and treating the resultant supernatant or filtrate by a biological procedure using active microorganism, or, alternatively, (2) adding acid to the alkaline waste to bring its pH below 3, separating the pectic substance therefrom, and treating the resultant supernatant or filtrate by a biological procedure using active microorganism.

SUMMARY OF THE INVENTION

The present invention is based on the findings that a supernatant or filtrate with a reduced viscosity can be obtained by (1) adjusting the pH in the acidic waste or a mixture of acidic- and alkaline wastes to a level over 7.0, adding acid thereto to bring its pH below 3, and separating the pectic substance therefrom, or, alternatively, (2) adding acid to the alkaline waste to bring its pH below 3, and separating the pectic substance therefrom; and that the capability of treating the waste is extremely enhanced by subjecting such supernatant or filtrate to a biological procedure, e.g. activated sludge treatment.

Also, the present invention is based on another finding that the pectic substance can be easily obtained in an excellent quality by collecting the pectic substance separated as above.

DESCRIPTION OF PREFERRED EMBODIMENTS

The purpose of adjusting pH in the acidic waste or a mixture of acidic- and alkaline wastes to a level over 7.0, according to the present invention, is to effect conditions favorable for substantial saponification of the pectic constituent. The conditions should be in the temperature range of 0°-80° C. and the pH range of 7-12 over a period in the range of 0.1-100 hours. Generally, such pH-adjustment of the acidic waste can be attained by admixing thereto the alkaline waste to effect neutralization. If necessary, caustic alkali, e.g. caustic soda or potash, carbonates, e.g. sodium or potassium carbonate, or other alkaline agents, e.g. ammonia, may be used alone or in combination.

Thereafter, the waste containing the pectic substance saponified as above, or the alkaline waste containing a saponificated pectic substance, has acid added thereto to bring its pH below 3, Such pH-adjustment should be carried out so that the pectic substance in the waste is easily separated therefrom by an appropriate procedure, such as centrifugation or filtration, in the subsequent separation step. Generally, one or more members selected from the group consisting of organic acids, e.g. oxalic acid and citric acid, and inorganic acids, e.g. phosphoric acid, hydrochloric acid, sulfuric acid and nitric acid, are added to the waste to bring its pH below 3, more particularly, in the range of 2–3. The most preferred pH range is from 2.4 to 2.9.

It has been confirmed that the pectic substance can be separated and removed, according to the present invention, in the yield of 50 w/w % or higher on the basis of dry solid, using conventional procedures, such as filtration or centrifugation. All "percentages" as used hereinafter are given on the basis of dry solid unless otherwise specified.

The large amounts of organic compounds in the supernatant or filtrate, e.g. saccharides and organic acids originating from orange loculi or locular walls, are biodegradable, intact or after neutralization, by conventional biological procedures wherein an active microorganism is used, e.g. an activated sludge system or yeast fermentation method. Thus, the treatment according to the present invention greatly enhances the capability of the biological procedure much more than that attained by any conventional method. Especially, the yeast fermentation method is preferable because it leads to the formation of other valuable side-product(s), e.g. yeast cell or ethanol, besides effecting an efficient treatment of the factory waste.

Since the viscosity of the remaining supernatant or filtrate, pH below 3, is low, it may be used, intact or in a mixture with a freshly prepared acid solution, in the subsequent locular wall removing step as an acid solution.

The method according to the present invention readily and efficiently removes the pectic substance from waste, a waste so far deemed as difficultly treatable; thus, canneries, where outputs have been restricted by the difficulty in the waste treatment, may readily step up their production by the practice of the present invention.

A high quality pectic substance can be easily obtained by collecting the pectic substance which has been separated as above. The pectic substance separated as above was found to substantially consist of pectic acid or low-methoxyl pectinic acid which can be converted into high-methoxyl pectinic acid, for example, by acid-catalized esterification using methanol as a solvent.

The pectic substance is generally neutralized with sodium carbonate, caustic potash or ammonia. After the neutralization, it may be, if necessary, purified by washing with an aqueous water-miscible organic solvent, e.g. aqueous methanol, ethanol or acetone, or by decolorizing in an aqueous solution with the use of activated carbon, followed by precipitation with a water-miscible organic solvent, such as methanol, ethanol or acetone. A pectic substance can be easily obtained in high quality by drying and subsequent pulverization of the precipitate.

The pectic substance thus obtained is an edible polymer with an average molecular weight in the range of about 20,000–500,000 daltons, which is hardly fermentable or non-digestable by human, but utilizable by a ruminant. The pectic substance is widely usable in food products or feeds, for example, as a filler, thickener, gelatinizer, jelly forming agent, glazing agent, moisture retaining agent, adhesive, vehicle, film forming agent, coagulant, dietary fiber, agent for intestinal disorder, toxicide, or decholesterol agent, as well as a main- or sub-material for preparing cosmetics, medicine or fertilizer.

The following EXPERIMENTs detail the present invention.

EXPERIMENT 1

Comparison of separation methods on their separabilities of the pectic substance In this EXPERIMENT, the specimen was an alkaline waste which had been used to remove orange locular walls in an orange cannery, and freed of suspended solids. The pH of the specimen was 12.0; relative viscosity, 3.37; and pectic content, 0.54 w/v %.

With the specimen, some methods using acid, ethanol or calcium (referred to as "acid method", "ethanol method" and "calcium method" respectively hereinafter) were compared on their separabilities.

EXPERIMENT 1-A

Acid Method

To 10 ml of the specimen was added 1.0N hydrochloric acid solution to bring its pH to 2.7, and the solution deionized water was further added to give a total volume of 20 ml, followed by 30 minutes standing at room temperature. After filtering the mixture solution with No. 5 A filter paper, the pectic content in the residue was determined on the basis of dry solid.

The recovery yield was about 83% against the pectic content in the specimen.

EXPERIMENT 1-B

Ethanol method

To 10 ml of the specimen was added 10 ml deionized water to give a total volume of 20 ml, and 50 ml of 60 v/v % aqueous ethanol solution was further added, followed by 30-minute standing at room temperature. The pectic substance was separated and determined similarly as in EXPERIMENT 1-A to give a recovery yield of about 60% against the pectic content in the specimen.

EXPERIMENT 1-C

Calcium method

To 10 ml of the specimen was added 10 w/v % calcium chloride solution to give a total calcium ion of 100 mg. Then, deionized water was added to the mixture solution to give a total volume of 20 ml, followed by 30 minutes standing at room temperature. The pectic substance was separated and determined similarly as in EXPERIMENT 1-A to give a recovery yield of about 60% against the pectic content in the specimen.

As is evident from the above experimental results, the acid method gave the highest recovery yield among the methods tested. In addition, the acid method does not require any expensive organic solvent, such as ethanol, and leads to less contamination, e.g. calcium, in the final product, besides having the advantage that the pectic substance is much more easily separable. Accordingly, the acid method is most desirable to separate and remove the pectic substance from the waste as well as to obtain a pectic substance with a high quality therefrom.

EXPERIMENT 2

Effect of pH on separability of the acid method

To 10 ml of the specimen was added 1.0N hydrochloric acid solution to bring its pH in the range of 0.7–4.5. Deionized water was added to the mixture solution to give a total volume of 20 ml, followed by 30 minutes standing at room temprature. The pectic substance was separated and determined similarly as in EXPERIMENT 1-A. The results are given in FIG. 2.

As is evident from FIG. 2, a satisfactory recovery can be obtained at a pH below 3. At a pH in the range of 2–3, a higher recovery yield of about 60% or higher is obtained. Especially, at a pH in the range of 2.4–2.9, a much higher recovery yield of about 70–90% is attained.

EXPERIMENT 3

Effect of the pectic concentration in the waste on separability by the acid method The specimen was concentrated or diluted with deionized water to obtain test solutions with different pectic concentrations of 0.05 w/v %, 0.1 w/v %, 0.2 w/v %, 0.4 w/v %, and 0.6 w/v %.

Each test solution was treated similarly as in EXPERIMENT 1-A to determine respective recovery yields. The results are given in FIG. 3.

As is evident from FIG. 3, at a pectic concentration exceeding 0.2 w/v %, the higher the pectic concentration in the test solutions, the higher the recovery yield is. In view of the facts that acid- and alkaline solutions are reused to remove the orange locular walls in orange cannery, and that the waste generally contains 0.2–1.5 w/v % pectic substance, one may easily recognize that the foregoing experimental results suggest the present invention can be advantageously practiced in such cannery.

Several embodiments of the present invention will be disclosed hereinafter.

EXAMPLE 1

An acidic water, pH 1.3, relative viscosity 7.14, pectic content 1.00 w/v %, which had been used to remove the locular walls in an orange cannery, was treated with caustic potash solution, and stirred at pH 7.5 for one hour at room temperature. The mixture was then subjected to a centrifugal dehydration to remove suspended solids, and the filtrate was adjusted to pH 2.7, followed by 30 minutes standing. Thereafter, the filtrate was subjected to a brief centrifugal dehydration to obtain a pectic substance in a recovery yield of about 90%.

The remaining filtrate with a reduced viscosity was neutralized with sodium carbonate, and subjected to the activated sludge system. The treatment was easily achieved without effecting floating of the sludge.

EXAMPLE 2

An alkaline waste, pH 12.2, relative viscosity 2.23, pectic content 0.35 w/v %, which had been used to remove the locular walls in a orange cannery, was acidified with sulfuric acid to pH 2.8. After 30 minutes standing, filtration of the waste gave a pectic substance in a recovery yield of about 75%.

Then, the remaining filtrate with a reduced viscosity was neutralized with ammonia water, and subjected to the activated sludge system. The treatment was easily achieved without effecting floating of the sludge.

Separately, a yeast was cultivated using the filtrate as a culture medium to obtain yeast cells. After adjusting the pH in the filtrate to 4.0 with ammonia water, a yeast strain, *Saccharomyces uvarum* IFO 0565, was inoculated thereto, and cultivated thereon at 30° C. for 10 hours under aerobic conditions. Thereafter the resultant culture was centrifuged, and the yeast cells were harvested from the sediment. The recovery yield was about 60% against the sugar constituent in the culture medium. All operations were carried out according to conventional methods.

The remaining supernatant was easily treated intact by the activated sludge system.

The yeast cells thus obtained may be advantageously usable, for example, as a protein or vitamin source in food products or feeds, as well as an α-glucosidase source.

EXAMPLE 3

A waste solution mixture, pH 9.5, relative viscosity 4.45, pectic content 0.61 w/v %, was prepared by admixing acidic- and alkaline wastes, which had been used to remove the locular walls in an orange cannery, and allowed to stand for 30-minutes. Thereafter, the waste mixture was treated similarly as in EXAMPLE 1 to recover the pectic substance in a yield of about 85%.

The remaining filtrate was easily treated similarly as in EXAMPLE 1.

EXAMPLE 4

A waste solution mixture, pH 11.3, relative viscosity 3.52, pectic content 0.31 w/v %, containing a washing water for the locular wall removal used after the acid- and alkali treatments in an orange cannery, was continuously subjected to a centrifugal dehydration, while maintaining the pH at 2.8 with hydrochloric acid, to recover the pectic substance in a yield of about 70%.

The remaining filtrate was easily treated by the activated sludge system similarly as in EXAMPLE 2.

EXAMPLE 5

A pectic substance, obtained similarly as in EXAMPLE 1, was dissolved in water, and the resultant pectic solution was adjusted to pH 4.0 with caustic soda solution. Thereafter, to the solution was added 0.5 w/v % activated carbon to effect decolorization. After filtering the solution, to the filtrate was added ethanol to give a concentration of 50 v/v %, followed by centrifugal dehydration. After dissolving the residue in water, to the resultant solution was added ethanol, and the mixture was subjected to a centrifugal dehydration, similarly as above. The residue was dried in vacuo, and pulverized to obtain a refined pectic substance in a recovery yield of about 70% against the starting material.

After analyzing the pectic substance according to the assay method as reported in *Journal of Food Science*, Vol. 32, page 197 (1967) with a slight modification, the substance was found substantially consisting of pectic acid with an average molecular weight of 120,000±30,000 daltons.

The pectic substance may be advantageously usable in various food products, cosmetics or medicines, as in the case of the commercial pectic acid or low methoxyl pectinic acid.

EXAMPLE 6

To 30 g of a refined pectic substance in powder form, obtained similarly as in EXAMPLE 5, was admixed 900 ml of anhydrous methanol and 100 ml of 30 w/w % concentrated hydrochloric acid solution, and the mixture was placed in a closed vessel which was kept at 30° C. for 48 hours to effect esterification. After completion of the reaction, the mixture was filtered on a glass filter. The residue was washed thereon with 70 v/v % aqueous ethanol for three times, and dissolved in 1 liter water. The pectic solution was adjusted to pH 6.0 with ammonia water, and added with ethanol to give a concentration of 60 v/v % to effect the precipitation of the pectic substance. After filtering the resultant, the residue was washed with acetone, dried in vacuo, and pulverized to obtain a highly methoxylated pectic substance in a yield of about 90% against the starting refined pectic substance.

No decrease in average molecular weight was noted in the pectic substance, in comparison with that of the pectic acid obtained in EXAMPLE 5.

The pectic substance may be advantageously usable in various food products, cosmetics or medicines, as in the case of the commercial high methoxyl pectinic acid.

EXAMPLE 7

A pectic substance, obtained similarly as in EXAMPLE 3, was washed with anhydrous methanol, and subjected to esterification similarly as in EXAMPLE 6 to obtain a highly methoxylated pectic substance in the yield of about 85%.

The resultant pectic substance, having an average molecular weight of 100,000±20,000 daltons, may be advantageously usable in various food products, cosmetics or medicines, as in the case of the commercial high methoxyl pectinic acid.

From the foregoing descriptions, it will be apparent that the present invention provides a practical method for treating the waste fluid from orange canneries and a process for recovering pectic substance therefrom.

It will be understood by those skilled in the art that various modifications of the present invention with reference to the foregoing EXAMPLEs may be employed without departing from the scope of the invention. Many variations and modifications thereof will be apparent to those skilled in the art and can be made without departing from the spirit and scope of the invention herein described.

Figure 1:
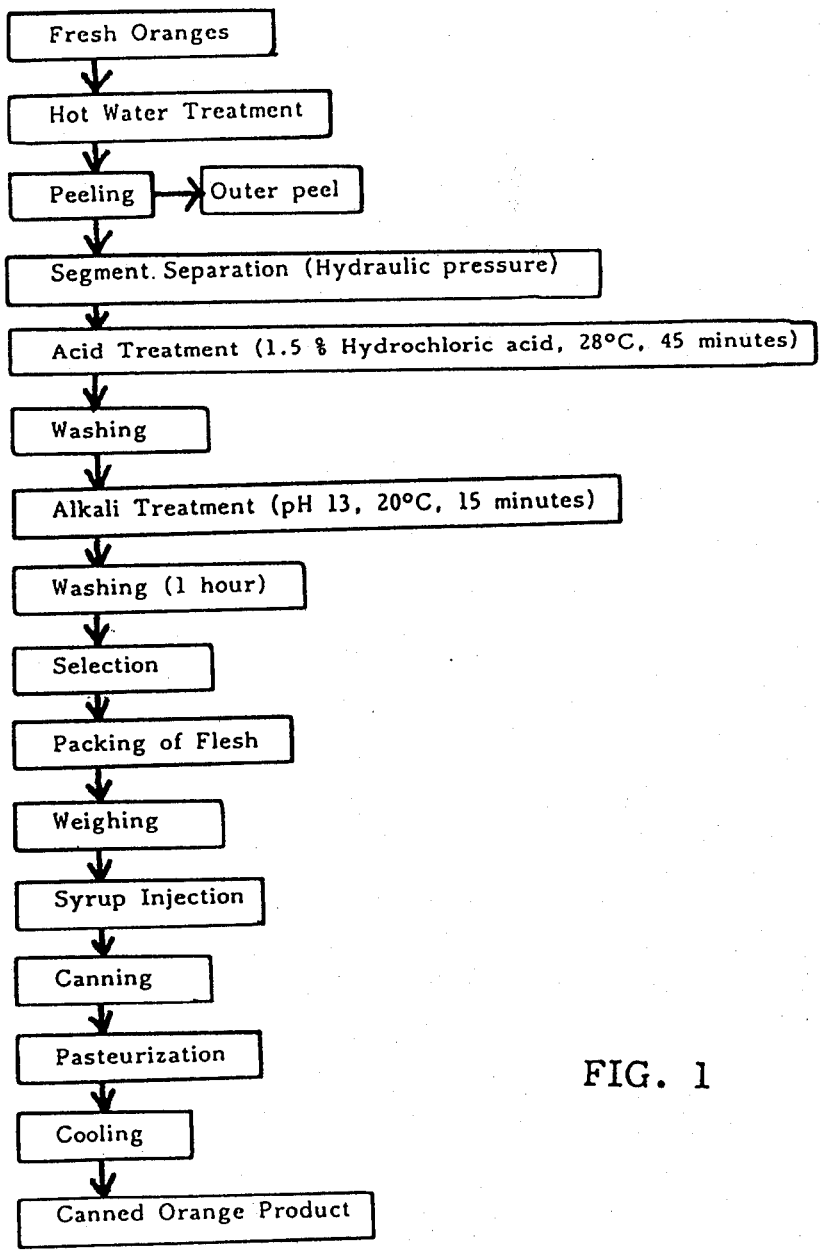
FIG. 1 illustrates the flow chart for the production of canned oranges.
Figure 2:
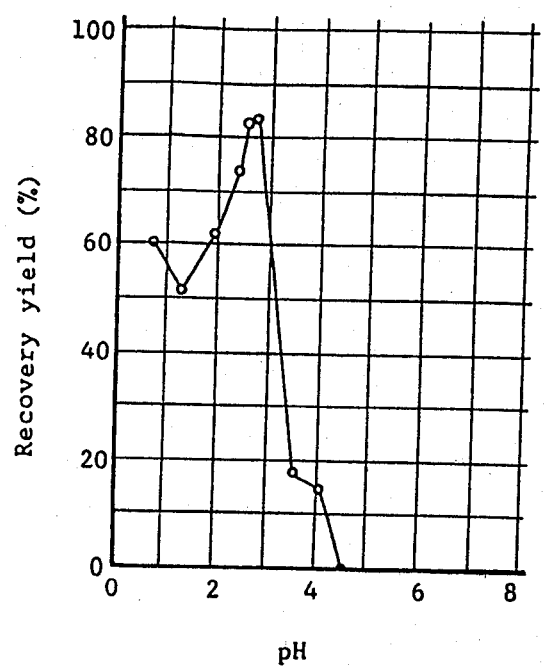
FIG. 2 graphically shows the effect of pH on the separation of the pectic substance from the waste.
Figure 3:
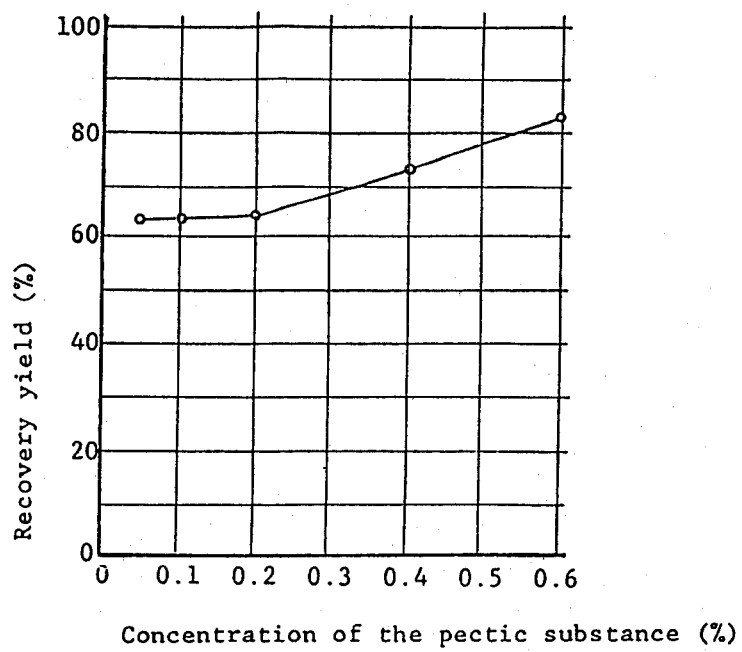
FIG. 3 graphically shows the effect of the pectic concentration in the waste on the separation of the pectic substance therefrom.

What is claimed is:

1. A method for treating a pectic waste fluid from an orange cannery, said method comprising:
   (1) adjusting the pH in the acidic waste or a mixture of acidic and alkaline wastes to a level over 7.0;
   allowing the acidic waste or mixture to stand for a period sufficient to effect substantial saponification of the pectic constituent;
   adding acid thereto to bring its pH below 3;
   separating the pectic substance from the resultant; and
   treating the resulting supernatant or filtrate by a biological procedure, or, alternatively,
   (2) adding acid to the alkaline waste to bring its pH below 3;
   separating the pectic substance from the resultant; and
   treating the resultant supernatant or filtrate by a biological procedure.

2. A method in accordance with claim 1, wherein said pH below 3 is in the range of 2.4–2.9.

3. A method in accordance with claim 1, wherein said acidic waste or mixture is allowed to stand at a temperature in the range of 0°–80° C. for 0.1–100 hours.

4. A method in accordance with claim 1, wherein said pH level over 7 is up to 12.

5. A method in accordance with claim 1, wherein said acid is a member selected from the group consisting of oxalic acid, citric acid, phosphoric acid, hydrochloric acid, sulfuric acid and nitric acid.

6. A method in accordance with claim 1, wherein said biological procedure is the activated sludge system or yeast fermentation method.

7. A method in accordance with claim 1, wherein the pectic concentration in the waste or mixture is in the range of 0.2–1.5 w/v %.

8. A process for recovering pectic substance from a pectic waste fluid from an orange cannery, said process comprising:
   (1) adjusting the pH in an acidic waste or a mixture of acidic and alkaline wastes to a lever over 7.0;
   allowing the waste or mixture to standing for a period sufficient to effect a substantial saponification of the pectic constituent;
   adding acid thereto to bring its pH below 3; and
   separating and collecting the pectic substance from the resultant, or, alternatively,
   (2) adding to the alkaline waste to bring its pH below 3; and
   separating and collecting the pectic substance from the resultant.

9. A process in accordance with claim 8, wherein the average molecular weight of the pectic substance is in the range from 20,000 to 500,000 daltons.

10. A process in accordance with claim 8, wherein the pectic concentration in the waste or mixture is in the range of 0.2–1.5 w/v %.

11. In a method for treating a pectic waste fluid from an orange cannery wherein the waste is treated by a biological procedure using an activated microorganism, the improvement whereby the treatment capability is extremely enhanced, comprising:
   (1) adjusting the pH in the acidic waste or a mixture of acidic and alkaline wastes to a level over 7.0;
   allowing the waste or waste mixture of stand for a period sufficient to effect a substantial saponification of the pectic substance;
   adding acid thereto to bring its pH below 3;
   separating the pectic constituent from the resultant; and
   treating the resultant supernatant or filtrate by a biological procedure, or, alternatively,
   (2) adding acid to the alkaline waste to bring its pH below 3;
   separating the pectic substance from the resultant; and treating the resultant supernatant or filtrate by a biological procedure.

12. In a process for recovering pectic substance from a pectic waste fluid from an orange cannery wherein the waste is treated either with inorganic salt or water-miscible organic solvent to effect precipitation of the pectic constituent, and recovering the pectic substance from the resultant precipitate or filtrate, the improvement whereby a pectic substance with a much higher quality can be much easily obtained, comprising:

(1) adjusting the pH in the acidic waste or a mixture of acidic and alkaline wastes to a lever over 7.0;

allowing the waste or waste mixture to stand for a period sufficient to effect a substantial saponification of the pectic constituent;

adding acid to the waste or waste mixture to bring its pH below 3: and separating and collecting the pectic substance from the resultant, or, alternatively, (2) adding acid to the alkaline waste to bring its pH below 3; and separating and collecting the pectic substance from the resultant.

* * * * *